(12) United States Patent
Abdallah

(10) Patent No.: US 7,913,733 B2
(45) Date of Patent: Mar. 29, 2011

(54) COMPOSITE TIRE ASSEMBLY

(75) Inventor: David G. Abdallah, Akron, OH (US)

(73) Assignee: Bridgestone Americas Tire Operations, LLC

( * ) Notice: Subject to any disclaimer, the term of this patent is extended or adjusted under 35 U.S.C. 154(b) by 1379 days.

(21) Appl. No.: 11/407,154

(22) Filed: Apr. 19, 2006

(65) Prior Publication Data

US 2007/0246139 A1   Oct. 25, 2007

(51) Int. Cl.
*B60C 3/02* (2006.01)
*B60C 3/00* (2006.01)
*B60C 11/02* (2006.01)
*B60C 19/12* (2006.01)
*B60B 9/22* (2006.01)

(52) U.S. Cl. .............. 152/159; 152/9; 152/56; 152/57; 152/453

(58) Field of Classification Search .......... 152/159–164, 152/173–177, 185, 185.1, 186–189, 203–207, 152/192–195, 453, 8–10, 53, 56, 57, 59–68
See application file for complete search history.

(56) References Cited

U.S. PATENT DOCUMENTS

| | | | | |
|---|---|---|---|---|
| 648,179 | A * | 4/1900 | Shellenberger | 152/187 |
| 863,040 | A * | 8/1907 | McLean | 152/56 |
| 863,535 | A * | 8/1907 | Hippisley | 152/173 |
| 871,481 | A * | 11/1907 | Corwin | 152/65 |
| 947,215 | A * | 1/1910 | Caswell | 152/63 |
| 965,698 | A * | 7/1910 | Ehrich | 152/56 |
| 968,941 | A * | 8/1910 | Harrison | 152/176 |
| 1,060,195 | A * | 4/1913 | Livingston | 152/207 |
| 1,070,570 | A * | 8/1913 | Wolf | 152/65 |
| 1,127,878 | A * | 2/1915 | Geisendorfer | 152/56 |
| 1,140,778 | A * | 5/1915 | Trigalet | 152/185 |
| 1,343,567 | A * | 6/1920 | Jakovleff | 152/56 |
| 1,366,080 | A * | 1/1921 | Kaufman | 152/175 |
| 1,423,977 | A * | 7/1922 | Weber | 152/56 |
| 1,733,081 | A * | 10/1929 | Leach | 152/56 |
| 1,750,260 | A * | 3/1930 | Dielmann | 152/63 |
| 1,816,176 | A * | 7/1931 | Castorina | 152/161 |
| 1,988,352 | A * | 1/1935 | Galindo | 152/159 |
| 2002/0170640 | A1 * | 11/2002 | Schmidt | 152/56 |

FOREIGN PATENT DOCUMENTS

SU   1652101 A1 *  5/1991

* cited by examiner

*Primary Examiner* — Adrienne C Johnstone
(74) *Attorney, Agent, or Firm* — Shaun Fox; Arthur Reginelli

(57) ABSTRACT

A tire for a vehicle comprises, an inner wheel (12) adapted to mount to a vehicle having a radially outer surface (34). A first ring (16) is annular and concentric with the inner wheel (12) and has a radially outer (40) and a radially inner (38) surface. An annular inner-tube (14) is securely positioned between the inner wheel (12) and the first ring (16). A second ring (18) has a radially outer surface (46) and a radially inner surface (44) adapted to mate with first ring (16). A tread (20) is secured to radially outer surface (46) of said second ring (18).

5 Claims, 2 Drawing Sheets

COMPOSITE TIRE ASSEMBLY

FIELD OF THE INVENTION

One or more embodiments of the present invention are directed toward a tire assembly.

BACKGROUND OF THE INVENTION

A typical tire is constructed on a rotating drum, where successive layers are applied. These layers can include belts, liners, plies, beads, and finally treads. After construction, the assembled components are laid in a press where pressure and heat are applied to the tire in order the cure the internal components. This general method of tire construction has been used for decades.

The aforementioned method of tire construction has several drawbacks. First, the method of construction is difficult and time consuming. Also, the final product may have certain physical limitations.

There is therefore a need for an improved tire which is easy to assemble and provides more uniform support for the tread.

SUMMARY OF THE INVENTION

In one or more embodiments, the present invention provides a tire for a vehicle comprising an inner wheel adapted to mount to a vehicle and having a radially outer surface, a first ring which is annular and concentric with the inner wheel and having a radially outer and a radially inner surface, an annular inner-tube positioned between said inner wheel and the first ring, a second ring having a radially outer surface and a radially inner surface adapted to mate with the first ring, and a tread secured to said radially outer surface of the second ring.

In one or more embodiments, the present invention also includes a tire for a vehicle comprising an inner wheel including a body portion which is disc shaped, having a circumferential flange on a radially outer portion thereof, the flange including a groove portion, a first ring which is annular having a radially inner circumferential surface, the radially inner circumferential surface includes a groove portion, an inner-tube positioned between the inner wheel and the first ring and received in the first ring groove and the inner wheel groove, and a tread positioned radially outward of the first ring.

In one or more embodiments, the present invention further provides a tire for a vehicle comprising an inner wheel adapted to couple to a vehicle, an inner-tube positioned radially outward of the inner wheel, a tread, and a ring positioned between the inner-tube and the tread, having a radially outer surface having a cross section which is substantially flat, wherein the tread couples to the radially outer surface.

DETAILED DESCRIPTION OF ILLUSTRATIVE EMBODIMENTS

Figure 1:
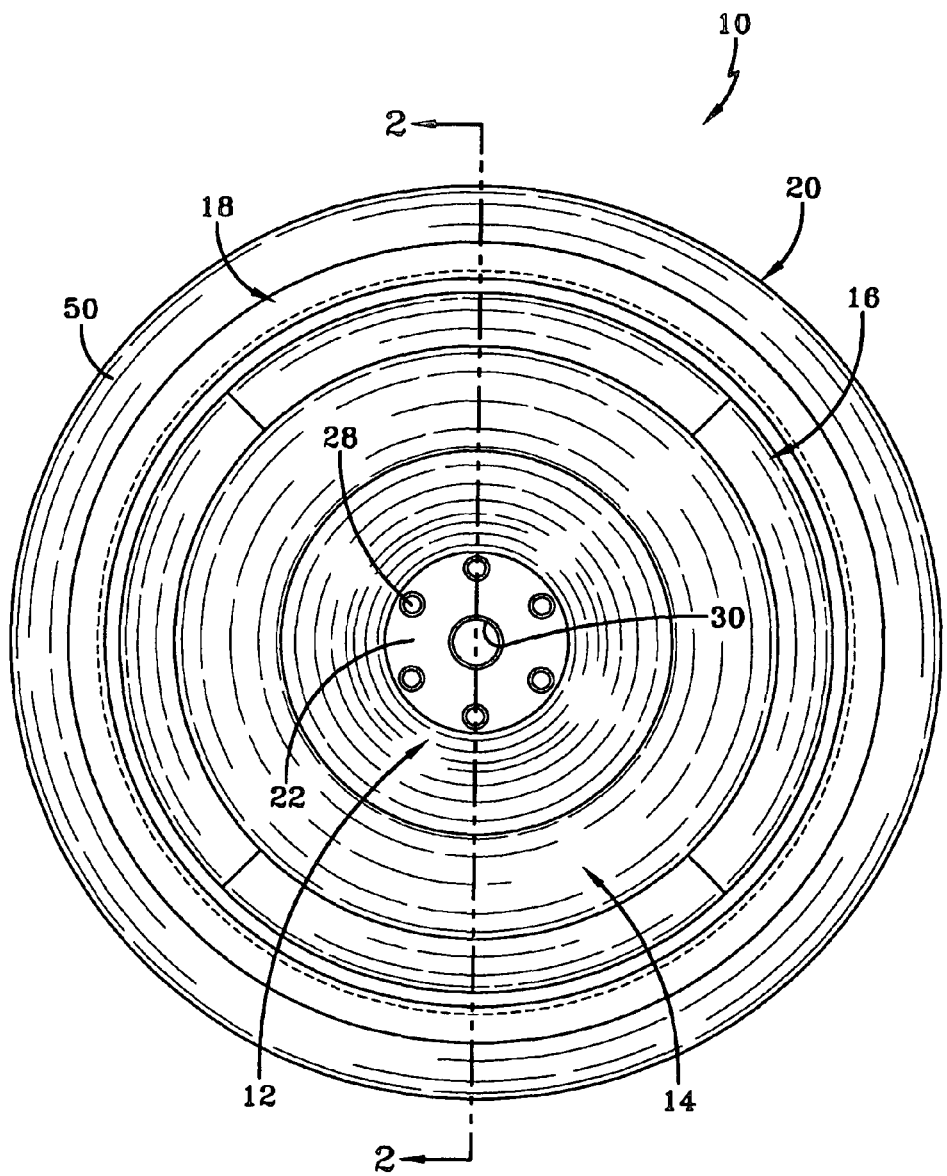
FIG. 1 is a side view of the tire of the present invention.

A tire assembly of one or more embodiments of the present invention, which is generally referred to by the numeral 10, can be described with reference to FIGS. 1 and 2. Tire assembly 10, which may also be referred to as a wheel assembly 10, may include an inner wheel 12, a inner-tube 14, a first ring 16, a second ring 18 and a tread 20. Tire 10 may be adapted to mount to a vehicle hub and may be used for any application, including but not limited to, passenger vehicles, racing vehicles, or industrial use.

In one or more embodiments, inner wheel 12 includes a generally disc shaped body 22 centered about an axis 24. Inner wheel 12 includes a circumferential flange 26 at the radially outer edge 23 of body 22. Body 22 can be adapted to provide the connecting means for mounting to a vehicle. To that end, body 22 may be provided with circumferentially spaced bolt holes 28, which may receive bolts extending from the wheel hub of a vehicle (not shown). Body 22 may further be provided with a central bore 30, which may receive a projection from the hub of a vehicle (not shown); this configuration may promote easy mounting and improve tire stability. It should be appreciated that the above connecting means are merely exemplary as any means may be used to couple the tire of the present invention to a vehicle.

The flange 26 may be provided with a circumferential groove 32 on the radially outer surface thereof. Groove 32 receives a radially inner portion 34 of inner-tube 14. In one or more embodiments, the cross-sectional shape of groove 32 may be semi-circular. In yet another embodiment, the cross-sectional shape of groove 32 may define a partial oval. In any case, groove 32 can be adapted or configured to secure inner-tube 14 to wheel 12 and thereby prevent relative axial movement or decoupling. To that end, the surface of groove 32 may be provided with rough texture, serrations, or the like, which may increase the frictional forces between inner-tube 14 and wheel 12 and prevent inner-tube 14 from sliding within groove 32 during use.

Figure 2:
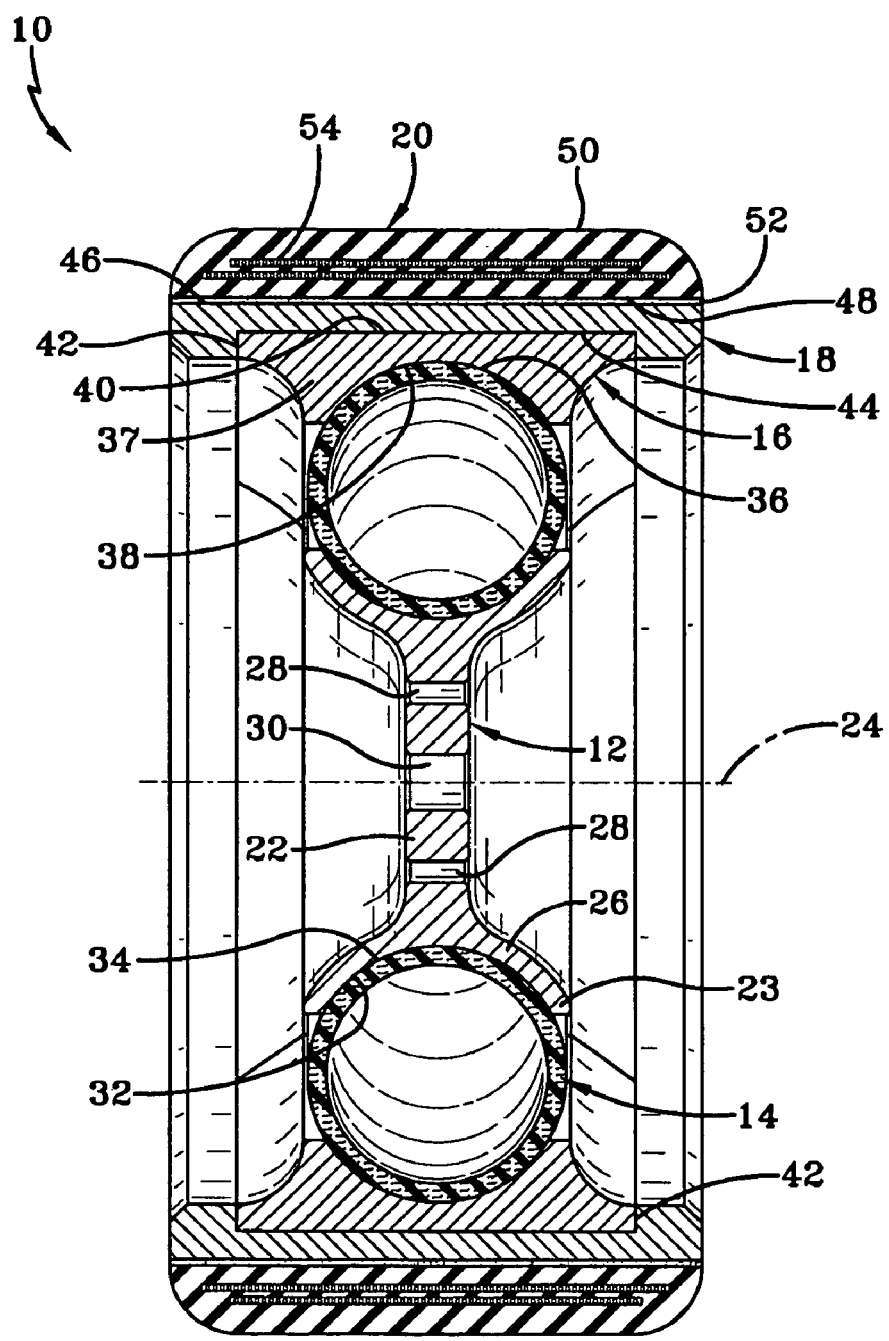
FIG. 2 is a sectional view of the tire of the present invention.

In one or more embodiments, inner-tube 14 can be described as a torus, having a cross-section that is circular, as is shown in FIG. 2. In yet another embodiment, inner-tube 14 may be ring shaped having a cross section other than circular. For instance, the cross section of inner-tube 14 may be in the form of an oval. Inner-tube 14 may be constructed of flexible rubber or synthetic materials, and may be further reinforced with fibrous materials in order to increase load bearing capabilities. As assembled, inner-tube 14 may be filled with a gas such as air at high pressure. When so inflated, the radial forces of the inflated inner-tube can secure inner-tube 14 within groove 32. Inner-tube 14 may advantageously provide a shock absorbing function. For example, when radial forces are applied to tire 10, inner-tube 14 may deform slightly and then recover, thereby absorbing these forces.

First ring 16 may provide a generally annular band that can receive radially outer portion 36 of inner-tube 14. In one or more embodiments, first ring 16 may be of metal composition. Exemplary metals include steel, aluminium, brass or others. In yet another embodiment, first ring 16 may include a polymeric material. Exemplary polymeric materials may include thermoplastic or thermosets as well as polyaramid or polyimide resins. First ring 16 includes a circumferential groove 38 on the radially inner surface 37 thereof. Groove 38 can receive radially outer portion 36 of inner-tube 14 to secure the same therein. To that end, groove 38 may be provided with a rough texture, serrations, or the like, which may increase the friction therebetween. When inner-tube 14 is inflated, the radial forces thereby created can hold the inner-tube securely within groove 38. As is evident from FIGS. 1 and 2, the inner-tube 14 can thereby be securely maintained between inner wheel 12 and first ring 16.

In one or more embodiments, first ring 16 includes a radially outer surface 40, the cross section of which may be generally flat. In one or more embodiments, the radially outer surface 40 of first ring 16 has a greater axial width than the maximum axial width of inner-tube 14, as shown in FIG. 2. First ring 16 may be further provided with side surfaces 42 that extend radially inward from outer surface 40. In one or more embodiments first ring 16 may be constructed in a plurality of separable pieces in order to facilitate easy construction or disassembly. For example, as shown in FIG. 1, first ring 16 may include four segments, although any number may be used. In yet another embodiment first and second rings 16 and 18 may be formed as a single unified structure.

In one embodiment, second ring 18 may provide a generally annular band that can receive first ring 16, and may include a circumferential channel 44 on the radially inner surface thereof. Channel 44 can securely receive radially outer surface 40 and side surfaces 42 of first ring 16 and thereby secure the same therein. In one or more embodiments, second ring may be of metal composition. Exemplary metals may include steel, aluminum, brass or others. In yet another embodiment, second ring 18 may include a polymeric material. Useful polymeric materials may include thermoplastic or thermosets as well as polyaramid or polyimide resins. Second ring 18 may include a radially outer surface 46 that may be provided with a generally flat cross section as is shown in FIG. 2, and may be adapted to receive tread 20. To that end, radially outer surface 46 may be provided with a rough texture, serrations, or the like in order to promote adhesion to tread 20. In one or more embodiments, tread 20 may have an axial width that is approximately equal to the axial width of radially outer surface 46 of second ring 18, as depicted in FIG. 2.

In one embodiment, tread 20 may include a generally annular band and may include a radially inner surface 48 and a radially outer surface 50. Radially inner surface 48 can couple to radially outer surface 46 of second ring 18. In one embodiment, an adhesive 52 may be applied to radially outer surface 46 of second ring 18 prior to construction in order facilitate bonding. In another embodiment, the tread 20 may be overmolded onto the second ring 18 during construction thereof. Radially outer surface 50 of tread 20 may be provided with a tread pattern in order to achieve improved handling and performance. The tread may include a rubber compound. The rubber compound may include metal adhesion promoters. Exemplary metal adhesion promoters may include cobalt carboxylates, resorcinol tackifiers or other appropriate materials. Further, tread 20 may include circumferential reinforcement 54, which may improve endurance and performance. Circumferential reinforcement may include materials exhibiting high modulus of elasticity. Exemplary high modulus materials may include aramids (trade name Kevlar), steel, polyester or other suitable materials.

As is evident from FIG. 1, the cross sections of radially inner surface 48 of tread 20 and the radially outer surface 46 of second ring 18 may be flat. This orientation may advantageously reduce the risks of tread corner separation by eliminating the standard radius edge of prior art treads.

Various modifications and alterations that do not depart from the scope and spirit of this invention will become apparent to those skilled in the art. This invention is not to be duly limited to the illustrative embodiments set forth herein

What is claimed is:

1. A tire for a vehicle comprising:
   an inner wheel including a body portion which is disc shaped, having a circumferential flange on a radially outer portion thereof, said flange including a groove portion;
   a first ring which is annular having a radially inner circumferential surface and a radially outer surface, said radially inner circumferential surface having a groove portion and said radially outer surface of said first ring having a generally flat cross-section;
   an inner-tube positioned between said inner wheel and said first ring and received in said first ring groove and said inner wheel groove, the inner-tube having a maximum axial width;
   a tread positioned radially outward of said first ring; and
   a second ring positioned between and in contact with both said tread and said first ring, wherein said second ring includes a radially inner surface which is provided with a circumferential channel, and said first ring includes a radially outer surface which is received in said channel, the radially outer surface of said first ring having a greater axial width than the maximum axial width of said inner-tube, said second ring also including a radially outer surface having an axial width, said tread having an axial width equal to the axial width of said radially outer surface of said second ring.

2. The tire of claim 1, wherein said first ring is formed from a plurality of separable segments to facilitate assembly and disassembly of the tire.

3. The tire of claim 1, wherein said tread includes a rubber portion and a reinforcing material portion.

4. The tire of claim 1, wherein said tread is coupled to said radially outer surface.

5. The tire of claim 1, wherein said second ring is made of a plastic material.

* * * * *